(12) United States Patent
Price et al.

(10) Patent No.: US 7,900,138 B2
(45) Date of Patent: Mar. 1, 2011

(54) REAL-TIME SINGLE ENTRY MULTIPLE CARRIER INTERFACE (SEMCI)

(75) Inventors: David K. Price, Farmington, CT (US);
David F. Plante, Lebanon, CT (US);
Michael O. Duffy, Hebron, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 12/657,772

(22) Filed: Jan. 27, 2010

(65) Prior Publication Data

US 2010/0153522 A1  Jun. 17, 2010

Related U.S. Application Data

(63) Continuation of application No. 09/952,990, filed on Sep. 14, 2001, now Pat. No. 7,657,833.

(60) Provisional application No. 60/232,711, filed on Sep. 15, 2000.

(51) Int. Cl.
G06F 17/00 (2006.01)
G06F 17/30 (2006.01)

(52) U.S. Cl. .................. 715/239; 715/234; 715/249; 707/756

(58) Field of Classification Search .......... 707/756; 715/234, 239, 249
See application file for complete search history.

(56) References Cited

U.S. PATENT DOCUMENTS

| | | | |
|---|---|---|---|
| 6,012,098 A | 1/2000 | Bayeh et al. | |
| 6,154,738 A | 11/2000 | Call | |
| 6,507,857 B1 | 1/2003 | Yalcinalp | |
| 6,565,609 B1 | 5/2003 | Sorge et al. | |
| 6,601,071 B1 | 7/2003 | Bowker et al. | |
| 6,635,089 B1 | 10/2003 | Burkett et al. | |
| 6,643,652 B2 | 11/2003 | Helgeson et al. | |
| 6,687,873 B1 | 2/2004 | Ballantyne et al. | |
| 6,725,426 B1 | 4/2004 | Pavlov | |

(Continued)

OTHER PUBLICATIONS

Sliwa, Carol, et al., "B-to-B Hard to Spell with XML", Computerworld, Feb. 25, 2000, 3 pages, downloaded from: www.computerworld.com.au/article/32759/b-to-b_hard_spell_xml/.*

Rai, Umesh Kumar, et al., "Realising XML Benefits in Life Insurance", Wipro Technologies White Paper, © 2001, 20 pages.*

Davenport, Thomas H., "The Future of Enterprise System-Enabled Organizations", Information Systems Frontiers, vol. 2, No. 2, © 2000, pp. 163-180.*

(Continued)

*Primary Examiner*—Robert Stevens
(74) *Attorney, Agent, or Firm*—Howard IP Law Group, PC

(57) ABSTRACT

A method and system for converting ACORD XML files to and from ACORD AL3 files in real-time. The method for converting from ACORD XML to ACORD AL3 format includes: applying a stylesheet to at least one ACORD XML file thereby generating at least one data record in an intermediate format and including information included in the at least one ACORD XML file; and, translating the at least one record in the intermediate format to ACORD AL3 format. The method for converting from ACORD AL3 files to ACORD XML files includes: translating at least one record including information stored in the ACORD AL3 file format to an intermediate format; and, applying a stylesheet to the at least one record in the intermediate format thereby generating at least one ACORD XML file being indicative of the information and suitable for transmission.

20 Claims, 4 Drawing Sheets

U.S. PATENT DOCUMENTS

| | | | |
|---|---|---|---|
| 6,795,868 B1* | 9/2004 | Dingman et al. | 709/246 |
| 6,820,135 B1* | 11/2004 | Dingman et al. | 709/246 |
| 6,928,487 B2* | 8/2005 | Eggebraaten et al. | 709/246 |
| 6,971,096 B1 | 11/2005 | Ankireddipally et al. | |
| 7,257,647 B2 | 8/2007 | Katz et al. | |
| 7,257,947 B2 | 8/2007 | Namuduri | |
| 2001/0049611 A1 | 12/2001 | Peach | |
| 2002/0023114 A1 | 2/2002 | Ito | |
| 2002/0049790 A1 | 4/2002 | Ricker et al. | |
| 2002/0073236 A1 | 6/2002 | Helgeson et al. | |
| 2002/0194033 A1 | 12/2002 | Huff | |
| 2004/0049738 A1* | 3/2004 | Thompson et al. | 715/513 |
| 2005/0144114 A1 | 6/2005 | Ruggieri et al. | |
| 2005/0154617 A1* | 7/2005 | Ruggieri et al. | 705/4 |
| 2010/0094871 A1* | 4/2010 | Ruggieri et al. | 707/737 |

OTHER PUBLICATIONS

"IA03: MQSeries Integrator V2—ACORD AL3 message adapter", IBM product literature. (www-1.ibm.com/support/docreview.wss?rs=203&uid=swg24000596&loc=en_US&cs=utf-8&lang=en, downloaded May 28, 2004), 2 pages.

"CLIEDIS Adopts XMLife—Partnership Formed With ACORD", Canadian Life Insurance Electronic Interchange Standards Association Newsletter, Dec. 2000, downloaded from: www.cliedis.ca/2000DecemberNews.pdf, pp. 1-4.

Associating Style Sheets with XML Documents Version 1.0, W3C Recommendation, Jun. 29, 1999, downloaded from: www.w3.org/1999/06/REC-xml- stylesheet-I 9990629/, pp. 1-5.

"Extensible Markup Language for Electronic Transactions in Higher Education", Postsecondary Electronic Standards Council, Washington, DC, May 2000, downloaded from: www.pesc.org/publications/whitepapers/XMLWhitePaper.pdf, pp. i-vi and 1-27.

"Telling It Like It Is", Rough Notes, Apr. 2000, downloaded from: www.findarticles.com/p/articles/mi_qa3615/is_200004/ai_n8891865/print, pp. 1-3.

Clark, James S., XSL Transformations (XSLT) Version 1.0, W3C Recommendation, Nov. 16, 1999, 1-90.

Ennser, Luis, et al., The XML Files: Using XML and SXL with ISM Websphere 3.0, IBM Corp., San Jose, CA, Doc. No. SG24-5479-00, Mar. 2000, pp. cover, i-xviii and 1-236.

Fuller, Rachel, et al., "Using XML in Conjunction with EDI", UNC Masters Thesis, School of Information and Library Science, Chapel Hill, NC, Apr. 2000, pp. 1-32.

Gilbane et al. (editors), The Gilbane Report, vol. 7, No. 8, Sep. 1999, pp. 1-32.

Giroti et al., "Maxsol's Cyber Solutions", The Rough Notes Magazine, Nov. 1999. (www.roughnotes.com/rnmag/november99/11p40.htm), pp. 1-7.

Huang, Shi-Ming, et al., "Developing an XML Gateway for Business-to-Business Commerce", WISE 2000, Hong Kong, China, Jun. 19-21, 2000, pp. 67-74.

Hyle, Robert Regis, "Here Comes Towerstreet", TechDecisions for Insurance, Jul. 2000. (www.technologydecisions.com/backissue/0700/7_7_00_10.asp), pp. 1-4.

Jagannathan, V., et al., "Workshop Report on Integrating XML & Distributed Technologies", ICE '99 Proceedings, O 1999, pp. 291-296.

Karpinski, Richard, "Procurement Vendors Tussle Over XML", Internetweek, Feb. 9, 1999, downloaded from: internetweek.cmp.com/news0299/news020999-6. htm, pp. 1-3.

Maciag, Gregory A., "A Wake-Up Call for Industry Standards—All of Them!", Technology Today, Apr. 13, 1998. (www.acord.org/news/NewsDetail./aspx?Type=I &aid=637), 2 pages.

Kotok, Alan, "XML and EDI Lessons Learned and Baggage to Leave Behind", XML.com, Aug. 4, 1999, downloaded from: www.xml.coml/lpt/a/165, pp. 1-9.

Maciag, Gregory A., "Having it Your Way with User Interface", Technology Today, Sep. 13, 1999. (www.acord.org/news/NewsDetail./aspx?Type=I &aid=653), 3 pages.

Maciag, Gregory A., "XML Will Be No Silver Bullet Without Standards", Technology Today, May 24, 1999. (www.acord.org/news/NewsDetail./aspx?Type=1 &aid=649), 3 pages.

Maciag, Gregory A., "SEMCI: Is There Really Any Doubt?", Technology Today, May 1, 1997. (www.acord.org/news/NewsDetail./aspx?Type=I &aid=617), 3 pages.

North, et al., "SAMS Teach Yourself XML in 21 Days", SAMS Publishing, Mar. 1999, pp. 453-467.

Parmanto, Bambang, et al., "Java Servlets for Web-Based Healthcare Computing", Journal of Healthcare Information Management, vol. 14, No. 1, Spring 2000, pp. 17-26.

Skonnard, Aaron, "The XML Files: XPath, XSLT and Other Specifications", MSDN Magazine, vol. 15 No. 5, May 2000, downloaded from: msdn.microsoft.com/msdnmag/issues/0500/default.aspx, pp. 1-8.

Tornqvist, A., et al., "XML and Objects—The Future for e-Forms on the Web", ENABL 1999, Stanford, CA, Jun. 16-18, 1999, pp. 303-308.

Trembly, Ara C., "New Tech May Overtake SEMCI", National Underwriter, vol. 104, issue 22, May 29, 2000. (downloaded from ABI/INFORM Trade & Industry database), 2 pages.

van Aartijk, Jr., Peter, "SEMCI: Paper Free This Century", Insurance Journal, San Diego, CA, copyright 1999, downloaded from: www.insurancejournal.com/magazines/southcentral/2000105115/partingshots/21121. htm, pp. 377-381.

Vidgen, Richard, et al., "XML: What is it Good For?", Computing—& Control Engineering Journal, vol. 11, Issue 3, Jun. 2000, pp. 119-124.

Woss, Wolfram, "XML and Meta Data Based EDI for Small Enterprises", DEXA 2000, LNCS 1873, London, UK, Sep. 4-8, 2000, pp. 357-365.

Yager, Tom, "BizTalk Simplifies Data Exchange", InfoWorld, Apr. 28, 2000; downloaded from: www.infoworld.com/elecbiztalk.html, pp. 1-6.

Towerstreet Home Page, WayBack Machine Internet Archive, http://web.archive.org/web/20000820042521/http://www.towerstreet.com/, copyright 2000, pp. 1-2.

"AL3", www.acord.org/standards/al3.aspx, downloaded Jun. 2, 2004, 3 pages.

"ACORD—XML for the Insurance Industry", Technology Today. (http:/lxml.coverpages.org/acord.html, downloaded May 28, 2004), pp. 1-20.

"ACORD Milestones", www.acord.org/about/evolution.aspx, downloaded Jun. 2, 2004, 2 pages.

"ACORD Transaction Working Group Brings Experience, Expertise to XML Standards Process", ACORD Press Release dated Jul. 13, 1999. (http://www.acord.org/ news/NewsDetail./aspx?Type=1 &aid=799), 2 pages.

* cited by examiner

REAL-TIME SINGLE ENTRY MULTIPLE CARRIER INTERFACE (SEMCI)

RELATED APPLICATIONS

This application is a continuation application of co-pending U.S. patent application Ser. No. 09/952,990 entitled REAL-TIME SINGLE ENTRY MULTIPLE CARRIER INTERFACE (SEMCI), filed Sep. 14, 2001, which application claims the benefit of U.S. Provisional Patent Application Ser. No. 60/232,711 filed on Sep. 15, 2000, the entire contents of both of which applications are hereby incorporated by reference herein for all purposes.

FIELD OF INVENTION

This invention relates generally to the implementation of several standards developed by ACORD, an insurance industry standards organization; and particularly to a Web Transaction Interface, XML Insurance and Surety Service Specification, and the EDI standard AL3.

COMPUTER PROGRAM LISTING APPENDIX

A Computer Program Listing Appendix, containing four (4) total files on a single compact disc, two (2) copies of which are submitted, is included with this application and incorporated by reference herein. The first file, named "listing1 (00007263).TXT", is 8,192 bytes and was created on Sep. 23, 2009. The second file, named "listing2 (00007264).TXT", is 28,672 bytes and was created on Sep. 23, 2009. The third file, named "listing3 (00007265).TXT", is 16,384 bytes and was created on Sep. 23, 2009. The fourth file, named "listing4 (00007262).TXT", is 14,336 bytes and was created on Sep. 23, 2009.

BACKGROUND OF THE INVENTION

The present Single Entry Multiple Carrier Interface (SEMCI) evolved out of the need for independent insurance agents to submit information to multiple insurance carriers. Historically, agents were required to use forms and systems provided by each carrier. Information common to all carriers was re-entered for each carrier creating redundant work for agents. To reduce this redundant work, ACORD defined the EDI standard known as AL3 and SEMCI was adopted as an insurance industry approach.

AL3 is focused on the communication between insurance carriers, their agents and other trading partners and has been in use since the 1980's. This EDI standard is a common set of rules that allow separate computer systems to talk to each other, to communicate policy data, accounting data, claims data, and application data for personal and commercial insurance, surety and specialty lines. SEMCI was implemented as a batch-oriented, store-and-forward "Electronic Data Interchange" (EDI) model using a private computer network. Agents and carriers submit EDI transactions over a private computer network to a clearinghouse. The clearinghouse places transactions in the "mail box" of the appropriate party and delivers the contents of each party's "mail box" to them on request.

With the advent of the Internet and related Internet standards, secure business-to-business commerce over a public network is now a reality. The insurance industry seeks to exploit this capability and Real-Time SEMCI is an implementation of electronic business-to-business commerce for insurance. Real-Time SEMCI provides agents the ability to enter data once into their agency management system and transmit that data over the Internet to multiple insurance company systems. The receiving insurance carriers process the transactions and return replies to the agent. For example, agents can request and receive quotes or submit applications for insurance. The implementation of Real-Time SEMCI relies on ACORD's Web Transaction Interface standard and ACORD's XML Insurance And Surety Service Specification. The Web Transaction Interface standard prescribes the communication protocol for this business as HTTP and it specifies an HTML form tag name that will contain transactions. ACORD's XML Insurance And Surety Service Specification defines business transactions using the World Wide Web Consortium's (W3C) XML standard.

As is well understood by those possessing an ordinary level of skill in the pertinent art, Hypertext Transfer Protocol, or HTTP, is a request/response application-level protocol for distributed, collaborative, hypermedia information systems. HTML is an authoring language used to create documents accessible via the World Wide Web (WWW) or (Web). HTML defines a structure and layout of a Web document by using a variety of tags and attributes. XML is a specification developed by the W3C especially for Web documents. XML allows designers to create their own customized tags, enabling the definition, transmission, validation and interpretation of data between applications and between organizations. Extensible Stylesheet Language (XSL) is a language for expressing stylesheets. It consists of a language for transforming XML documents, and an XML vocabulary for specifying formatting semantics. An XSL stylesheet specifies the presentation of a class of XML documents by describing how an instance of the class is transformed into an XML document that uses the formatting vocabulary.

It is an object of the present invention to translate from ACORD's XML Insurance And Surety Service Specification format to ACORD's AL3 EDI file format, so that insurance information communicated over the Internet or by other means and can be processed in the ACORD AL3 EDI file format.

It is a further object of the present invention to translate from ACORD's AL3 EDI file format to ACORD's XML Insurance And Surety Service Specification format so that insurance information processed in the AL3 format can be communicated over the Internet or by other means in ACORD's XML Insurance And Surety Service Specification format.

It is a further object of the invention to reduce the time and the cost required to rate and quote insurance policies.

SUMMARY OF THE INVENTION

A method and system for converting ACORD XML files to and from ACORD AL3 files in real-time. The method for converting from ACORD XML to ACORD AL3 format includes: applying a stylesheet to at least one ACORD XML file thereby generating at least one data record in an intermediate format and including information included in the at least one ACORD XML file; and, translating the at least one record in the intermediate format to ACORD AL3 format. The method for converting from ACORD AL3 files to ACORD XML files includes: translating at least one record including information stored in the ACORD AL3 file format to an intermediate format; and, applying a stylesheet to the at least one record in the intermediate format thereby generating at least one ACORD XML file being indicative of the information and suitable for transmission.

BRIEF DESCRIPTION OF THE DRAWINGS

Various other objects, features and advantages of the invention will become more apparent by reading the following detailed description in conjunction with the drawings, which are shown by way of example only, wherein.

DETAILED DESCRIPTION

The present invention, referred to as "Real-Time SEMCI", uses two emerging ACORD standards: the Web Transaction Interface (WTI) and the XML Insurance and Surety Service Specification. The WTI enables companies to conduct transactions with agents over the Web instead of via relatively expensive private networks. The XML Insurance and Surety Service Specification defines a set of industry-standard business transactions.

In the explanation that follows, it is assumed that AL3 files originate with a carrier's system and XML files originate with a carrier's trading partner. The present invention operates to translate one into the other and vice versa.

Referring now to the Figures, like references identify like elements of the invention. As set forth, AL3 is an insurance industry standard file format, a sample of which appears in text form in the Computer Program Listing Appendix, part of which is reproduced as LISTING 1 as follows:

Note that to improve readability of the hierarchy, line breaks have been added between data groups to visually set them off from each other and that the data group names and processing levels have been highlighted. Of course, highlighting and line breaks do not exist in the normal AL3 file format. The three digits that follow the data group name determine the actual length of each data group (e.g. 1 MHG data group is 161 characters long, 2TRG is 201, for example). Any reference to any LISTING throughout the specification herein signifies that the same result or effect occurs as when applied to the entire corresponding listing as appears in the Computer Program Listing Appendix. Listing 1 illustrates a text form of an AL3 file format. Listing 2 illustrates the data of the AL3 file format of Listing 1 organized according to a preferred form of the invention. Listing 3 illustrates a style sheet utilized according to a preferred form of the invention; and Listing 4 illustrates the data of Listing 1 in an XML file format organized according to a preferred form of the invention.

Figure 2A:
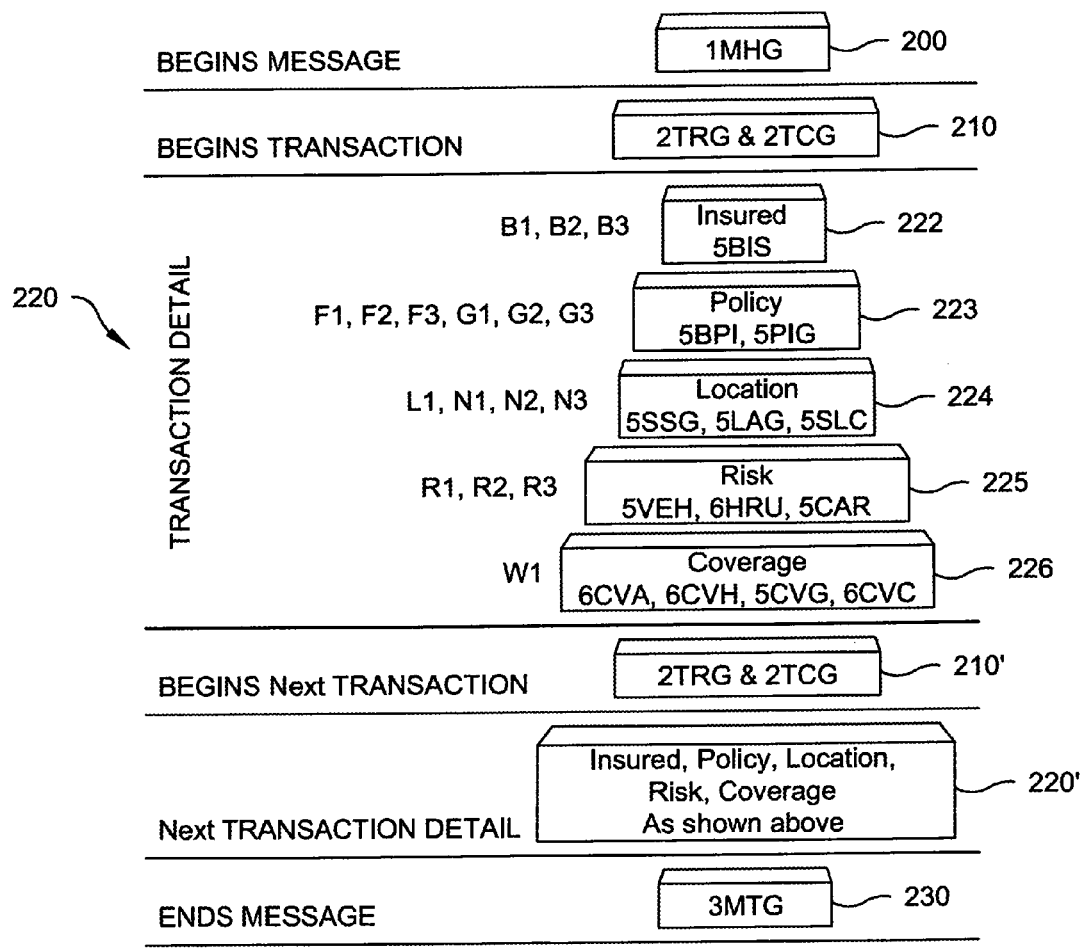
FIGS. 2*a* and 2*b* illustrate a data hierarchy for the AL3 file format.
Figure 2B:
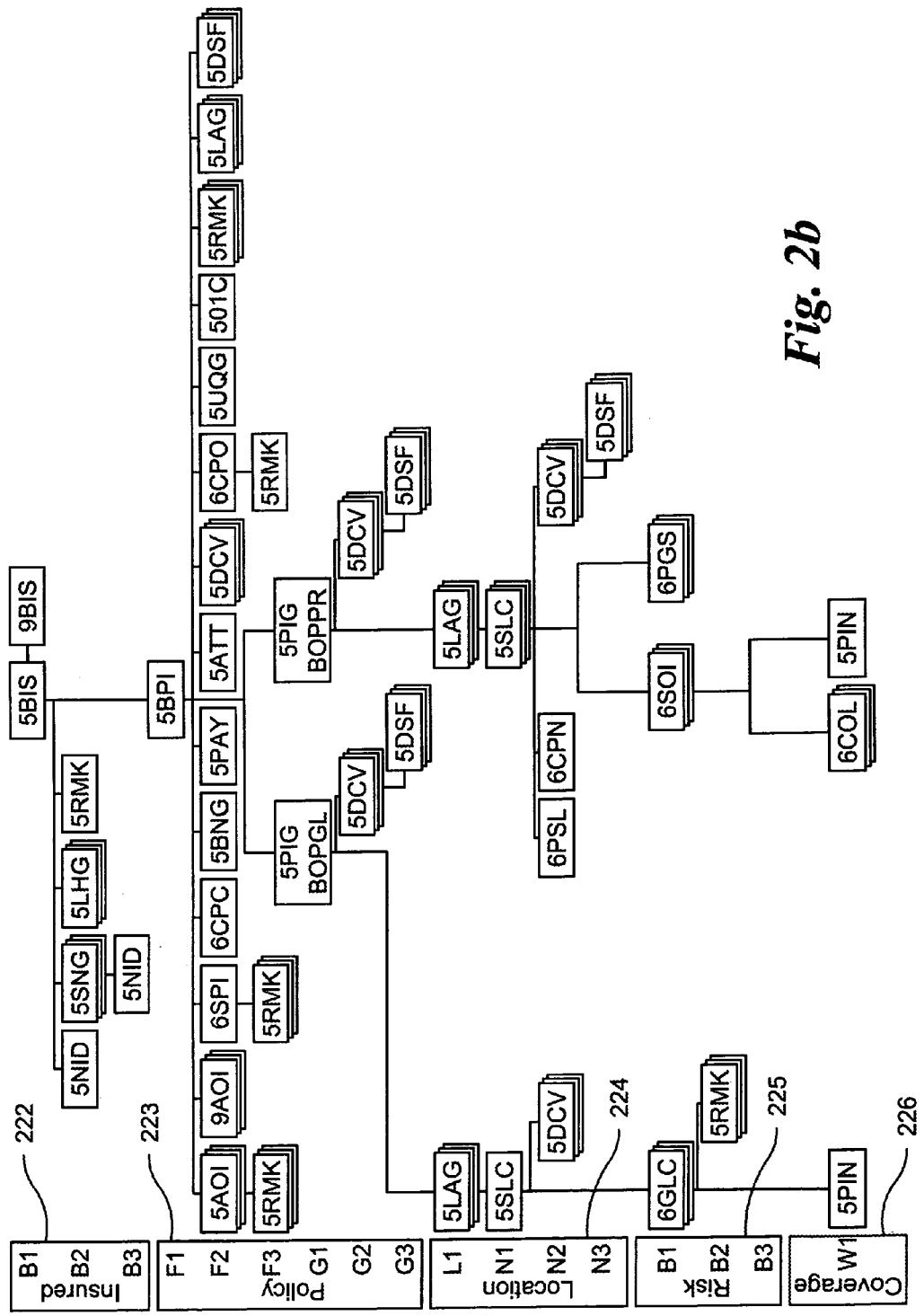

Referring still to LISTING 1, the formats are determined in advance based upon what kind of data the file will contain. Representative information contains data regarding by way of example, billing, new policy generation and inquiries regarding cancellation. The data format follows a hierarchy as indicated in FIGS. 2*a* and 2*b*, with a more detailed illustration of a hierarchy for a Business Owners Policy being provided in FIG. 2*b*. As is well understood by those possessing an ordinary skill in the pertinent art, the ACORD AL3 format is based on data elements, data groups and hierarchies. An

LISTING 1

```
1MHG161  IBM203HIGT02  IBM203APPLIE  98695048
2TRG201   60  3P CPKG  FMGBN B    THE HARTFORD
0001990924   9909013NBQ
2TCG135   900409205052031503309331092210937205043251010
5BIS172 1 B10001     CPat's Place
????????????????????????????????RTBOP- 1      IN
9BIS168      B10001
????????????????????????????????????????????????????????????????????? ???????????????????
???????????????????????????????????????????
5BPI240 3 F100015BISB10001  98SBAAC3043   ??????????19682 BOP
?????9090100090011?????????????????000001254093+00001254093+??PAAG?E?????????????
????  ??????00001254093+???????????????????????????????????????????????????????????????
????AAG
5PAY101 2 F200015BPIF10001
FL?????????????????????????????????????????????????USFL
6CP0173 5 F200015BPIF10001
CTN????????????????????????????????????????????????????????????????????????????
?????????????????????????   59430000???RLSPC ??????????????????????????????????
5DSF058 F200015BPIF10001    01FRCOL?????F0001000000??????
5DCV113 1 F200015BPIF10001   FRCOL
5LAG199 1 F200015BPIF10001    000175 Main St
???????????????????????????????Hartford     CT06115
??????????????????????????????????????????????????????????
5LAG199 1 F200025BPIF10001    0002250 Second St
???????????????????????????????Tampa       FL32004 ???????????????????9999
??????????????? ?????????????
5PIG152 1 G100015BPIF10001    BOPGL????00000000493+???19682
990901??????????????????????????????????????????????????????????????
5DCV113 1 G200025PIGG10001 EAOCC01000000
5DCV113 1 G200035PIGG10001 GENAG02000000
5DCV113 1 G200045PIGG10001 PRDC002000000
5DCV113 1 G200055PIGG10001 PIADV01000000
5DCV113 1 G200065PIGG10001 MEDEX00010000
5DCV113 1 G200075PIGG10001 FIRDM00300000
5LAG199 1 L100035PIGG10001
0001??????????????????????????????????????????????????????????????????????????
????????????????????????????????????????????????????????????????????
5SLC137   N100015LAGL10003 0175 Main St       Hartford     CT
06115      ?????
```

ACORD data element is the smallest piece of data collected and stored. Data Groups are logical collections of data elements. Hierarchies are used to establish a logical relationship of data groups to one another. In the hierarchy labeled 220 in FIG. 2a, each level is associated with the level immediately preceding it. For example, a Location group 224 is associated with a Policy group 223, a Risk group 225 is associated with a Location group and so on (e.g. coverage group 226). If needed, "Dummy" Groups are created to preserve the hierarchy.

Figure 1:
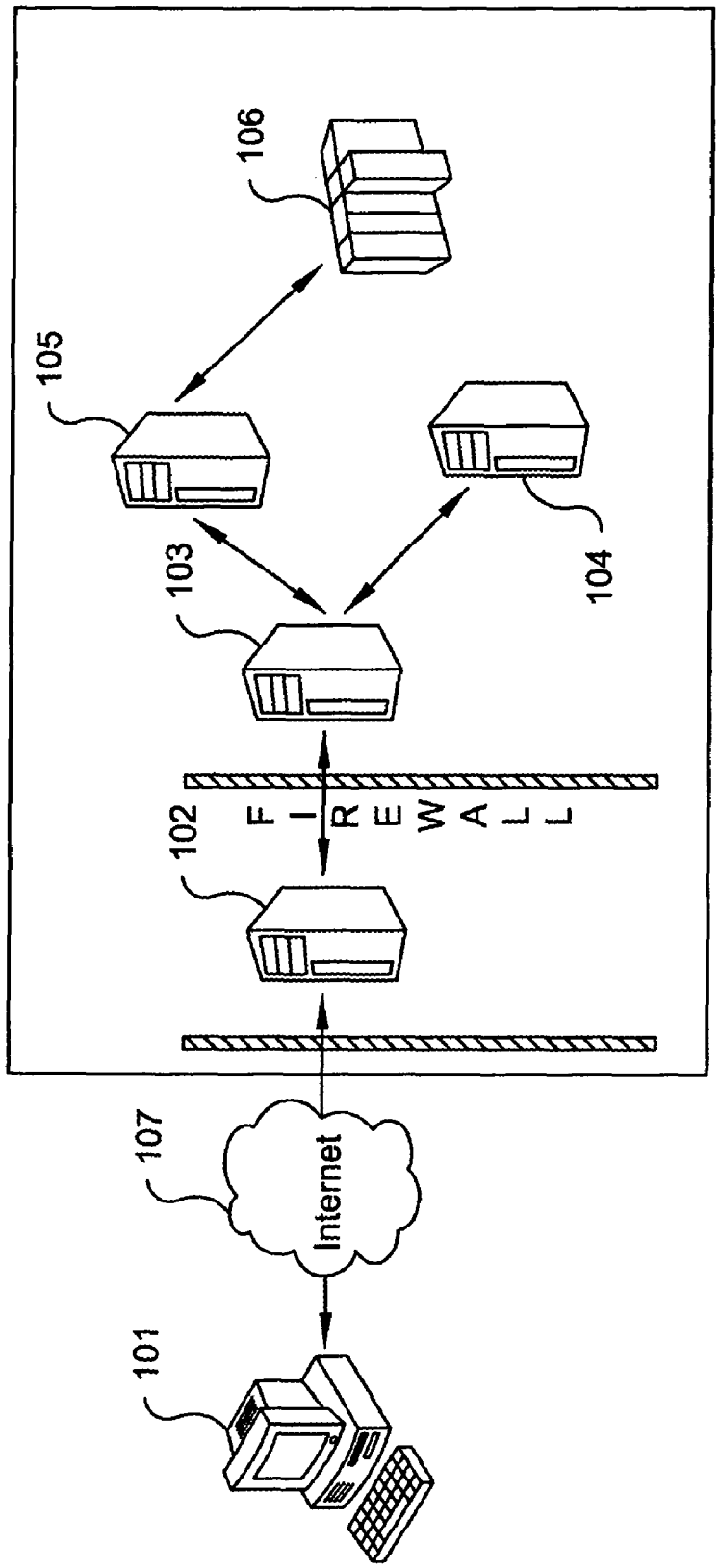
FIG. 1 illustrates a system topology overview utilized according to a preferred form of the present invention.

For sake of explanation the following discussion will follow a transaction which originates in a mainframe or other processing system such as that illustrated in FIG. 1. The text of LISTING 1 is a typical ACORD standard representation; in this instance for illustration an AL3 file delimited by the 1 MHG and 3MTG data groups 200, 230 as shown in FIG. 2a. Between delimiter data groups 200 and 230, the transaction sequence begins with data group 210, and transaction hierarchy 220, and proceeds with the next transaction data group 210' and next transaction hierarchy 220'. The AL3 file of LISTING 1 contains one transaction that begins with the 2TRG and 2TCG data groups 210 as shown in FIG. 2a. Still referring to LISTING 1, the text thereof indicates that ACORD data group 5BIS (shown as 222 in FIG. 2a) follows. This data identifies the basic insured information related to this specific policy and other data as is well understood by those possessing ordinary skill in the pertinent art.

Referring now also to FIG. 1, the first step is to retrieve an AL3 file, such as that illustrated in LISTING 1 and discussed hereto, from the mainframe or other processing system computer 106 via a message server 105. The next step is to translate the AL3 file retrieved data and organize it utilizing programming techniques well known by those skilled in the art of programming to translate and organize data, referred to herein as a Faux File Generator application running on the application server 103, such as is illustrated in the Computer Program Listing Appendix part of which is reproduced as LISTING 2 as follows:

LISTING 2

```
<?xml version= "1.0" standalone= "no"?>
<!DOCTYPE AL3 (View Source for full doctype...)>
```

-continued

LISTING 2

```
=<AL3>
=<GroupName= "1MHG "Length= "161" LineOfBusiness= "Common">
    <Sequence Index =" 0" Length = "10"> 1MHG161 </Sequence>
    <Sequence Index = "1" Length = "18"> 1BM203HIGT02 </Sequence>
    <Sequence Index = "2" Length = "18"> 1BM203APPLIE </Sequence>
    <Sequence Index = "3" Length = "10"> 98695048 </Sequence>
    <Sequence Index = "4" Length = "12" />
    <Sequence Index = "5" Length = "6" />
    <Sequence Index = "6" Length = "4" />
    <Sequence Index = "7" Length = "6" />
    <Sequence Index = "8" Length = " 13" />
    <Sequence Index = "9" Length = "1" />
    <Sequence Index = "10" Length = "10" />
    <Sequence Index = "11" Length = "2" />
    <Sequence Index = "12" Length = "1" />
    <Sequence Index = "13" Length = "4" />
    <Sequence Index = "14" Length = "6" />
    <Sequence Index = "15" Length = "20" />
    <Sequence Index = "16" Length = "20" />
</Group>
<GroupName ="2TR" Length= "201" LineOfBusiness= "Common">
    <Sequence Index = "0" Length = "10">2TRG201</Sequence>
    <Sequence Index = "1" Length = "2"> 60 </Sequence>
    <Sequence Index = "2" Length = "8"/>
    <Sequence Index = "3" Length = "1"/>
    <Sequence Index = "4" Length = "1">3</Sequence>
    <Sequence Index = "5" Length = "2">P</Sequence>
    <Sequence Index = "6" Length = "1">C</Sequence>
    <Sequence Index = "7" Length = "5">PKG</Sequence>
    <Sequence Index = "8" Length = "3">FMG</Sequence>
    <Sequence Index = "9" Length = "1">B</Sequence>
    <Sequence Index = "10" Length = "1">N</Sequence>
    <Sequence Index = "11" Length = "1"/>
    <Sequence Index = "12" Length = "1">B</Sequence>
    <Sequence Index = "13" Length = "10"/>
    <Sequence Index = "14" Length = "25"> THE HARTFORD </Sequence>
    <Sequence Index = "15" Length = "10"/>
```

The Faux File generator application organizes or retranslates the ACORD file LISTING 1 into an intermediary file format such as that illustrated in the Computer Program Listing Appendix part of which is reproduced as LISTING 2 above (referred to as Faux file 3 herein for sake of explanation) that can be read by a function that converts it to XML format.

LISTING 3

```
<?xml version=" 1.0"?>
    =<!- -
    XSL style sheet to transform a BOP quote response from a "faux" AL3 stream to XML.
    Copyright (c) The Hartford
    All rights reserved.
-- >
=<xsl:stylesheet version="1.0" xmlns:xsl="http://www.w3.org/1999/XSL/Transform">
    =<xsl:template match="/">
        =<BOPPolicyQuoteInqRs>
            <RqUID/>
        =<Status>
            =<xsl:choose>
                =<xsl:when test="//Group[@Name='2TRG']/Sequence[@index='4'] = '3'">
                <StatusCode>1<</StatusCode>
                <Severity>Info</Severity>
        =</xsl:when>
            =<xsl:otherwise>
                <StatusCode>100</StatusCode>
                <Severity>Error</Severity>
                    <StatusDesc>General Error<StatusDesc>
            =<xsl:otherwise>
        =<xsl:choose>
```

-continued

LISTING 3

```
=<Status>
=<xsl:choose>
    =<xsl: when test="//Group [@Name='2TRG']/Sequence[@Index='4'] ='3'">
        =<Producer>
            =<ContractNumber>
                <xsl:value-of
                    select="//Group[@Name='1MHG']/Sequence[@Index='3']" />
            </ContractNumber>
            =<ProducerSubCode>
                <xsl:value-of
                    select="//Group[@Name='5BIS']/Group[@Name='5BPI']/Sequ
                        ence[@Index='8'] "/>
            </ProducerSubCode>
        </Producer>
    =<Customer>
        = <CustomerName>
```

LISTING 2 illustrates the organization or ordering, e.g. parsing, of the AL3 file into a new kind of list which is referred to as a FAUX File 3, as exemplified by LISTING 3 noting the references to 1MHG, 2TRG, 2TCG, and 5BIS. The data of the Faux file 3 as exemplified by LISTING 2 is then translated into an ACORD XML for Insurance And Surety Service or other suitable tagged language as is shown in Computer Program Listing Appendix, part of which is reproduced as LISTING 4 below. Preferably, the process looks at each AL3 transaction, which begins with a 2TRG header.

LISTING 4

```
<?xml version ="1.0" encoding = "UTF-8"?>
    = <BOPPolicy QuoteInqRs>
        <RqUID/>
    = <Status>
        <Status Code> 1 </Status Code>
        <Severity>Info<Severity>
        </Status>
    =<Producer>
        <ContractNumber>98695048</ContractNumber>
        <ProducerSubCode>?????????<ProducerSubCode>
    </Producer>
=<Customer>
    =<CustomerName>
        <NameType>CORP</NameType>
    = <CommercialName>
        <Company Name/>
    </CommercialName>
    <CustomerName>Pat's Place</Customer Name>
= <CustomerAddress>
    <Addr1>????????????????????????????????????????????</Addr1>
    <Addr2>????????????????????????????????????????????</Addr2>
    <City>?????????????????????</City>
    <StateProv>??</StateProv>
    <PostalCode>?????????/PostalCode>
</CustomerAddress>
= <CustomerNumber>
    <ItemIDType>AgcyID</ItemIdType>
    <ItemId>RTBOP-1</ItemId>
</CustomerNumber>
</Customer>
= <CommercialPolicy>
    <PolicyNumber>98SBAAC3043</PolicyNumber>
    <LOBCode>BOP</LOBCode>
    <NAICCode>19682</NAICCode>
    = <EffectiveDate>
        <Year />
        <Month />
        <Day />
    </EffectiveDate>
```

FIGS. 2a and 2b show the hierarchical representation of the data in LISTING 1.

An XML stylesheet such as that illustrated in LISTING 3 above is preferably used to translate the Faux File as exemplified by LISTING 2 to the XML file as exemplified by LISTING 4 so that it contains the correct XML file format and accompanying data. There are preferably as many style sheets as there are "kinds of transactions" to translate.

The XML file as exemplified by LISTING 4 is then passed to Web Server 102 (see FIG. 1) and is transmitted over the Internet 107 and received remotely, presumably by an agency system 101 of an agent of the insurance company utilizing conventional methodology.

The process is transitive or bi-directional in that an XML format file generated at an agency system 101 will be decoded or translated using a style sheet into a Faux file and then translated into the AL3 file format before being sent to the mainframe or other processing system computer 106.

Figure 3:
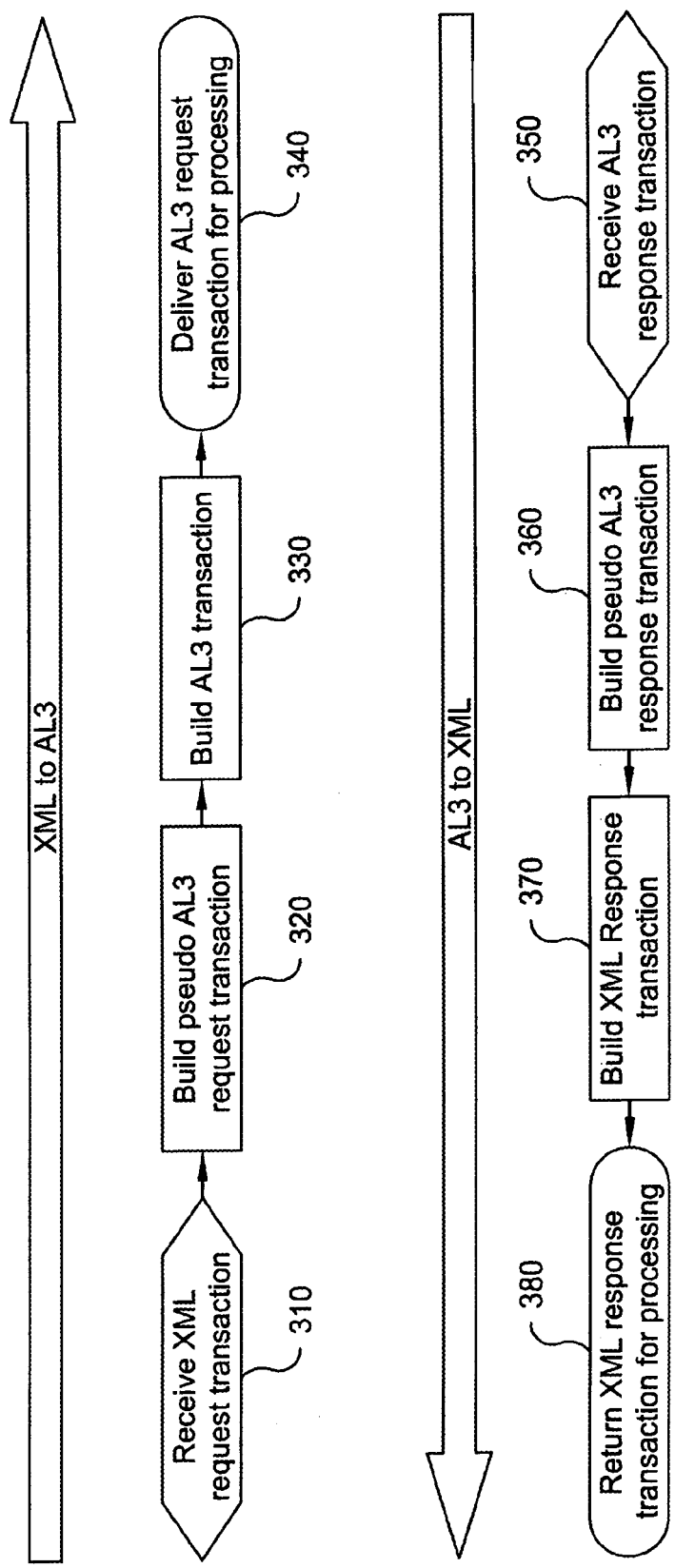
FIG. 3 illustrates an overview of XML file format to AL3 format translation and an AL3 file format to XML format translation according to a preferred form of the present invention.

Referring now also to FIG. 3, at the start of the process 310, XML request transactions are received from computer 101 (e.g. agency system, application service provider, insurance portal) of FIG. 1 and converted 320 to pseudo AL3 request transactions, or faux files, by applying a stylesheet, such as an XSL stylesheet. The data from the created faux file is then translated 330 into AL3 (including removing XML tags) and delivered 340 to the mainframe 106 or other processing system 106. AL3 response transactions are generated by the processing system and are returned to the translation process 350. AL3 response files are converted 360 into pseudo AL3 response transactions, or faux files (including adding XML tags). The data from the faux file is then translated 370 into XML formatted files using a style sheet. The XML file can then be transmitted 380 to suitable processor devices using the Internet and the process exited.

For sake of completeness, and referring again to FIG. 3 and a preferred embodiment of a system for implementing the present invention shown in FIG. 1, mainframe 106 or other processing systems 106 are electronically communicable with message servers 105. The message servers 105 are conventionally communicable with application servers 103. Application servers 103 perform the translating of AL3 files to the faux file 3 format and apply the stylesheets LISTING 4 to code the faux files 3 in XML format. The application servers 103 are conventionally communicable with web servers 102, which are conventionally communicable with agency computers 101, via a suitable communications medium such as the global interconnection of computers and computer networks commonly referred to as the Internet. Directory servers 104 are also preferably utilized and are communicable with application servers 103.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A computer-implemented method for converting data from ACORD XML format to ACORD AL3 format, comprising:
   receiving by a server data in ACORD XML format;
   converting by the server the received data to a tagged file format having tags incorporating AL3 sequence data, at least one of the tags having AL3 sequence data comprising sequence index and length data;
   converting by the server the received data in the tagged file format to ACORD AL3 format; and
   providing by the server the data in ACORD AL3 format as an output.

2. The computer-implemented method of claim 1, wherein at least one of the tags comprises group name and length data.

3. The computer-implemented method of claim 1, wherein the converting to ACORD AL3 format comprises employing the AL3 sequence data to format the data in ACORD AL3 format.

4. The computer-implemented method of claim 3, wherein the converting to ACORD AL3 format comprises removing the tags.

5. The computer-implemented method of claim 1, wherein the converting to an intermediate tagged file format comprises applying an XSL stylesheet to the received data.

6. A computer system for converting data related to an insurance transaction from ACORD XML format to ACORD AL3 format, comprising:
   a web server configured to furnish data related to an insurance transaction in ACORD XML format; and
   an application server in communication with the web server and configured to:
      receive the data in ACORD XML format from the web server;
      convert the received data to an intermediate tagged file format having tags incorporating AL3 sequence data, at least one of the tags comprising sequence index and length data; and
      convert the received data in the intermediate tagged file format to ACORD AL3 format.

7. The computer system of claim 6, wherein the application server is further configured to provide the ACORD AL3 format data in accordance with the sequence index and length data.

8. The computer system of claim 6, wherein the ACORD AL3 format data comprises data elements, data groups being logical groupings of the data elements and hierarchies establishing logical relationships among the data groups.

9. The computer system of claim 6, wherein the application server is configured to apply an XSL stylesheet to the data in ACORD XML format to convert the received data to the intermediate tagged file format.

10. The computer system of claim 6, further comprising a message server configured to receive the ACORD AL3 format data from the application server and to deliver the ACORD AL3 format data to a mainframe.

11. A computer-implemented method for converting ACORD AL3 format data to ACORD XML format data, comprising:
   receiving by a server data in ACORD AL3 format;
   converting by the server the received data to a format having tags incorporating AL3 sequence data, at least one of the tags having AL3 sequence data comprising data group name and length data;
   converting by the server the received data in the format having tags to ACORD XML format; and
   providing the ACORD XML format data as an output.

12. The method of claim 11, wherein the providing comprises furnishing the ACORD XML format data to a web server.

13. The method of claim 11, wherein the received data comprises data relating to an insurance transaction.

14. The method of claim 11, wherein the converting comprises applying an XSL stylesheet dependent upon an insurance transaction to the data in the format having tags.

15. The method of claim 11, further comprising receiving the ACORD XML data output at a web server, and furnishing the ACORD XML data by the web server in response to an XML request transaction.

16. A system for converting ACORD AL3 format data to ACORD XML format data, comprising:
   an application server configured to:
      receive data in ACORD AL3 format;
      convert the received data to a format having tags incorporating AL3 sequence data, at least one of the tags having AL3 sequence data comprising data group name and length data;
      convert the received data in the format having tags to ACORD XML format; and
      provide the ACORD XML format data as an output; and
   a web server for receiving the output ACORD XML format data from the application server for transmission.

17. The system of claim 16, wherein the length data associated with the data group name is determined by the length in characters of the data group in a file containing the AL3 format data.

18. The system of claim 16, wherein the application server is further configured to convert the received data in the format having tags employing an XSL stylesheet dependent upon an insurance transaction.

19. The system of claim 16, wherein the application server is further configured to receive the AL3 format data by retrieving an AL3 file from a processing system computer via a message server.

20. The system of claim 16, wherein at least one of the tags comprises sequence index data.

* * * * *